Figure 5:
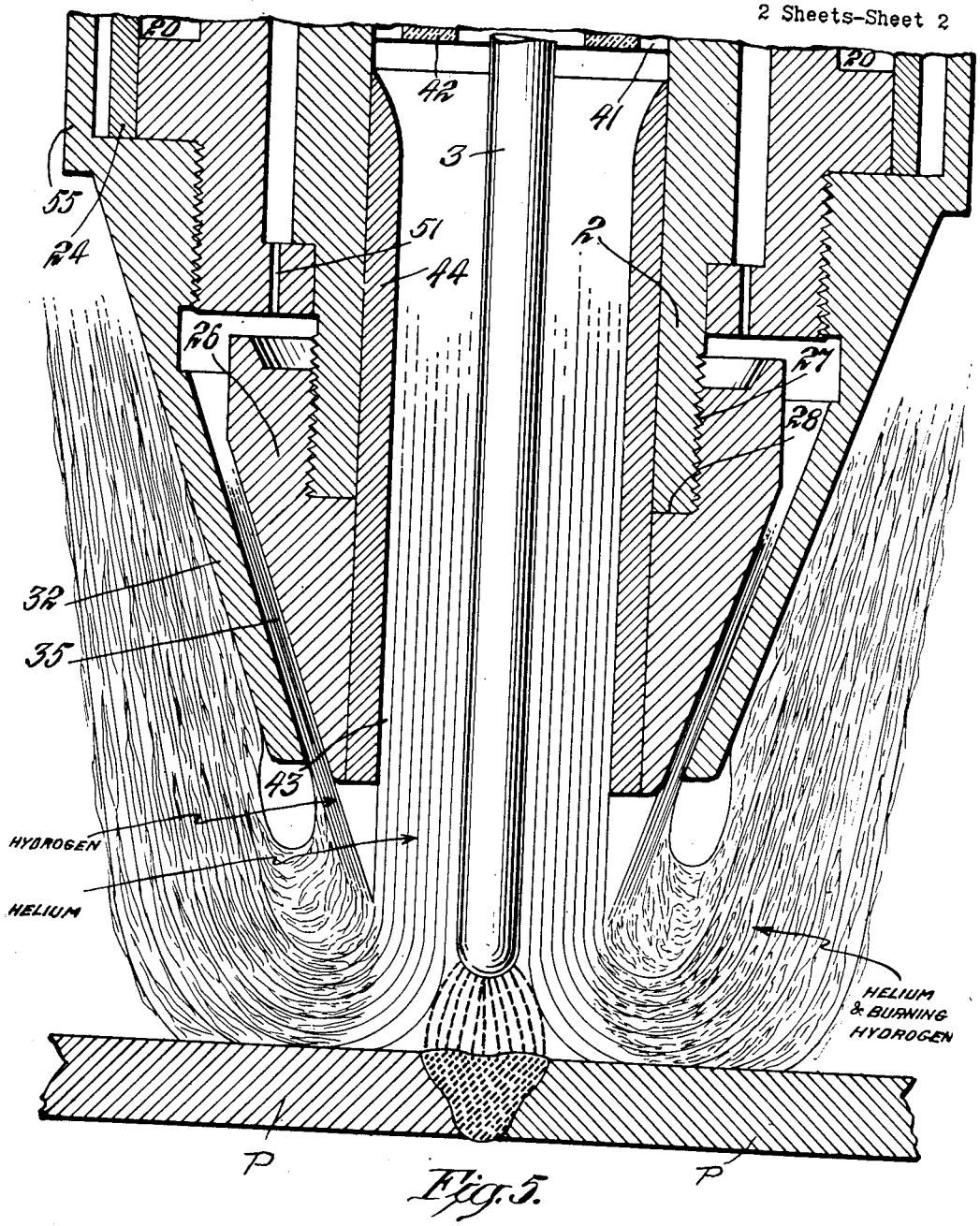

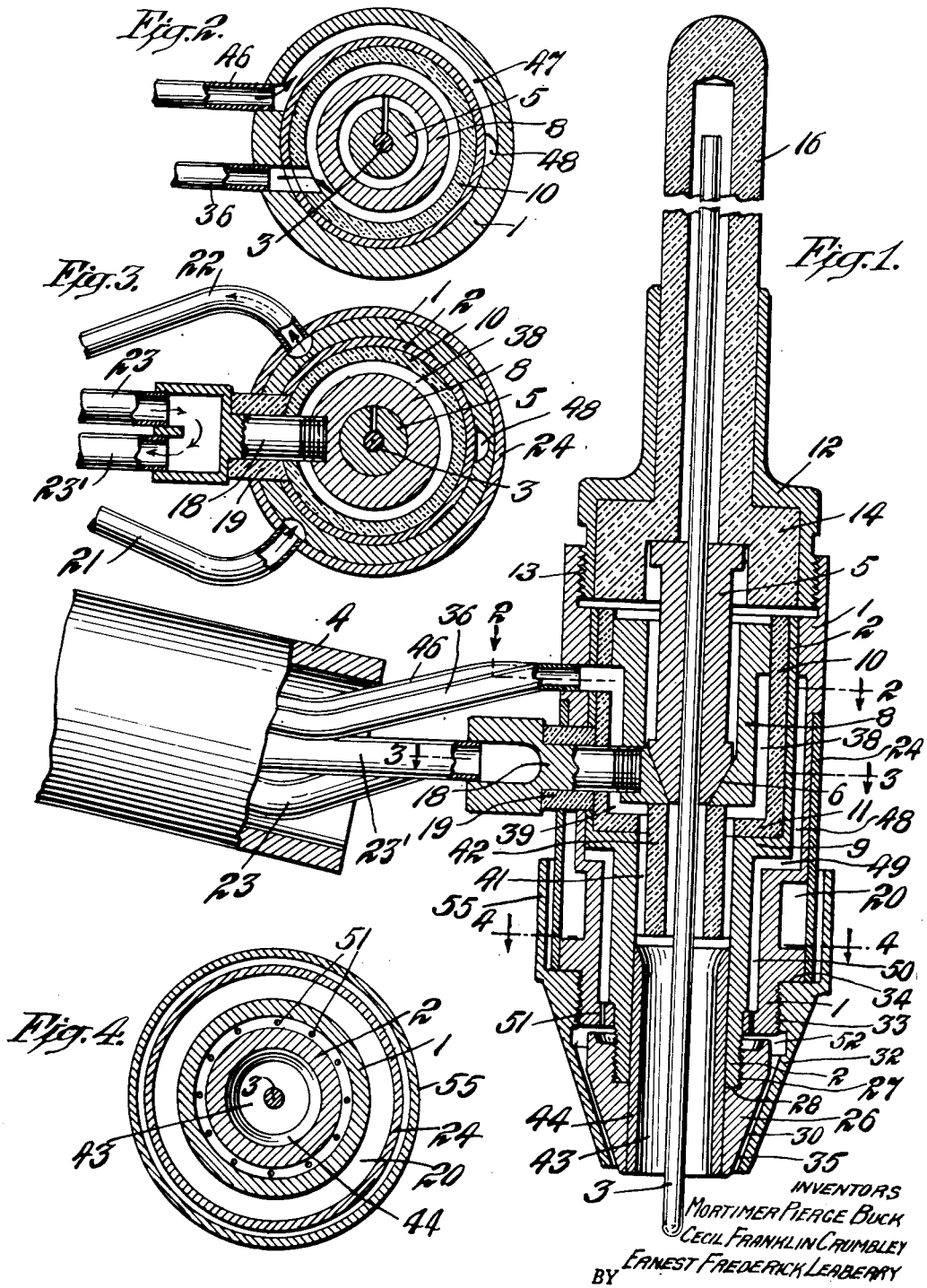

Patented Aug. 17, 1954

2,686,860

UNITED STATES PATENT OFFICE 2,686,860

INERT GAS-SHIELDED ARC WELDING TORCH

Mortimer P. Buck, Westfield, N. J., and Cecil Franklin Crumbley and Ernest Frederick Leaberry, Huntington, W. Va., assignors to The International Nickel Company, Inc., New York, N. Y., a corporation of Delaware Application November 19, 1952, Serial No. 321,346

14 Claims. (Cl. 219—14)

The present invention relates to the art of gas-shielded, electric-arc welding and, more particularly, to an improved welding torch and improved welding method capable of performing more successful gas-shielded arc welding of oxygen-sensitive metals and to produce satisfactory and sound welds substantially free of porosity.

It is well known that attempts have heretofore been made to accomplish the successful welding of nickel and of nickel-copper alloys especially of the type having about 60% to about 70% nickel and about 23% to about 30% copper with other alloying elements by inert gas-shielded arc welding operations but these attempts have not been fully successful with the welding torches heretofore employed.

We have discovered that objectionable porosity in the welding of nickel and nickel-copper alloys has been caused by small amounts of atmospheric air contaminating the customarily employed inert gas stream which surrounded the molten pool under the arc. The free oxygen present in said small amounts of said air reacted with the constituents of the molten pool resulting in gas formation and subsequent entrapment of this gas as the pool solidified. It has been found that the less time the molten pool has been exposed to the oxidizing effect of the air, the less porosity will be found in the weld.

Although many attempts were made to overcome the foregoing and other difficulties in the welding of nickel and nickel-copper alloys by the use of various structural modifications of shielded arc welding torches none, as far as we are aware, has been entirely successful when carried into practice commercially on an industrial scale.

It has now been discovered that very satisfactory welding of nickel and of nickel-copper alloys, especially those containing nickel from about 60% to about 70% and copper from about 23% to about 30% with other alloying elements, can be performed by gas-shielded arc welding operations with the employment of a welding torch having a special construction and operation which provide for the presence of a primary inert gas column in the form of a laminary flowing stream of helium or argon immediately surrounding the electrode whereby the arc and molten pool are effectively shielded from atmospheric air. The improved torch and method further contemplate the provision of a supplemental outer column of gas to be delivered through the nozzle as a laminary flowing stream in such a manner as to surround or envelop the primary gas column and to effectively prevent the churning up of atmospheric air and the incorporation of oxygen in the protective gas stream. The second column of gas is preferably constituted of hydrogen which is caused to issue from an annular orifice in smooth laminar flow free from turbulence. It is also within the contemplation of the invention to locate the secondary gas discharge port substantially flush with the discharge port of the primary gas column. In this manner, the secondary column of hydrogen surrounding the primary gas column protects the latter from contamination with the surrounding air by excluding such air and by preventing turbulence and air pickup. Consequently a fatal defect, common to prior types of welding torches, has been eliminated and the tendency to pick up or entrap air from the surrounding atmosphere has been overcome with the concomitant elimination of oxidation of the weld metal and high porosity in the weld.

It is an object of the present invention to provide an improved gas-shielded arc welding torch and method which are especially capable of successfully arc welding oxygen-sensitive metals including nickel and nickel-base alloys.

Another object of the present invention is to provide an inert gas-shielded arc welding torch and method employing a primary gas column surrounded or enveloped by a second annular gas column or stream in such manner as to effectively eliminate turbulence of the gas streams emerging from the torch nozzle.

The present invention also contemplates providing an improved arc welding torch and method which are especially adapted to direct a protective gas stream to surround the lower end of a welding electrode and to constitute said gas stream of an inner or primary column of inert gas of the helium or argon type and an outer or secondary column of hydrogen having a laminar flow so as to effectively control the gas stream and to impart thereto substantially uniform density and velocity and to avoid entrainment of the atmospheric air with resulting oxy-

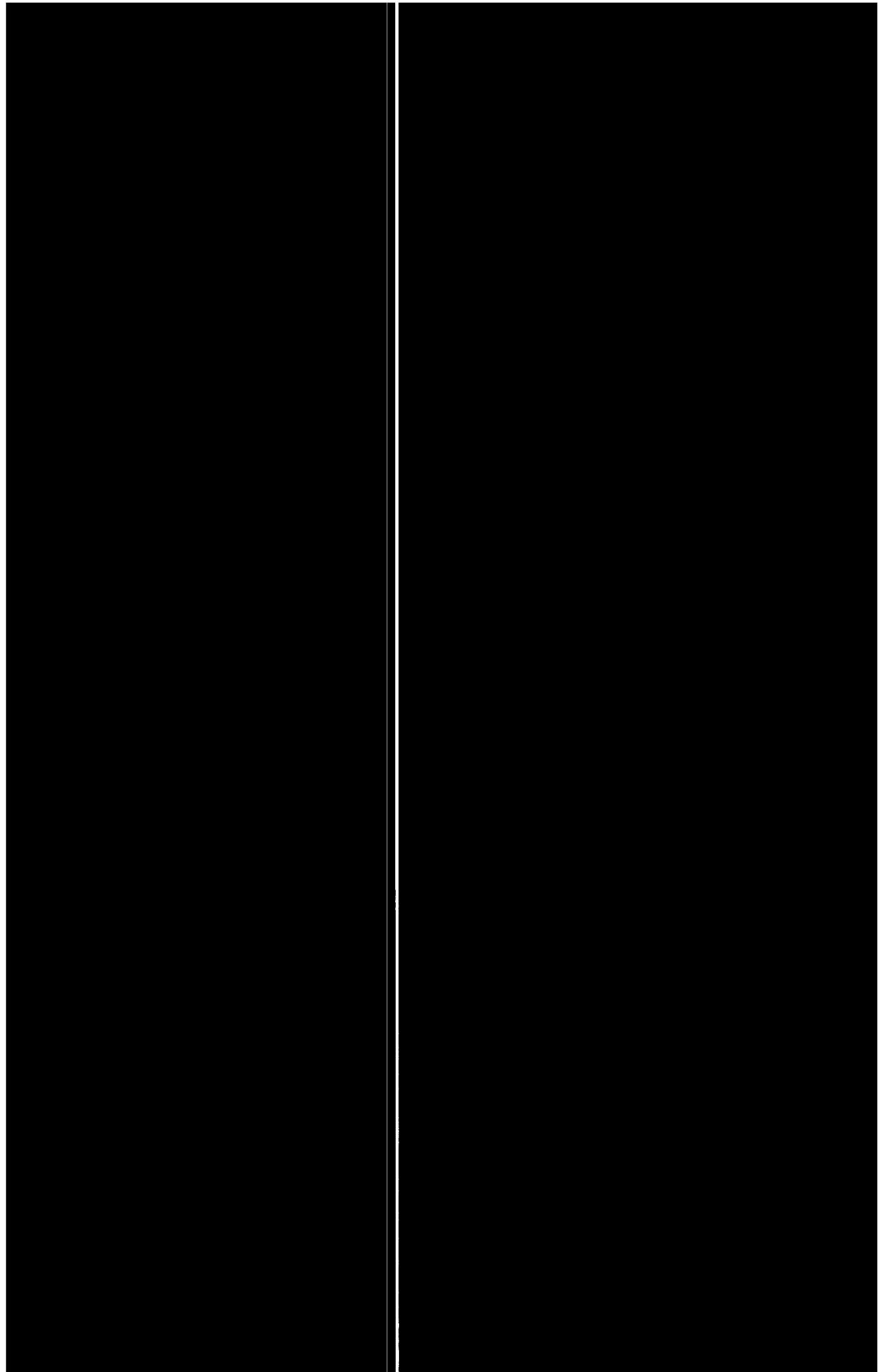

gas streams and for cooling water. The sleeve-like members likewise provide support for the central electrode and for the discharge nozzle assembly. The special construction offers advantages of simplicity in the assembly of the torch structure and of easy substitution of parts of various internal diameters to accommodate different electrode sizes. The structural arrangement includes the customarily employed longitudinally split sleeve-type of grip or clutch member 5 closely fitted to the electrode 3 and shaped at its lower end in the form of a frusto-conical section which is adapted to provide downwardly and inwardly inclined outer camming surfaces 6 engaging complemental surfaces of an inclined wall of a cylindrical member 8. The cylindrical member 8 surrounds the clutch or grip member 5 and is supported upon an inwardly extended shoulder 9 of the body member 2 with the interposition of an insulating sleeve 10 made of "Transite" or other suitable insulating material and having a surface channeled inward base or flange extension 11. The clutch or grip member 5 is supported at its lower end by the camming surface 6 and is compressed for the gripping of the electrode by means of a screw collar 12 engaging internal threads 13 of the upper end of the body member 1. The collar 12 is capable of exerting downward pressure by screw adjustment on the gripping member through the interposition of an insulating member 14 formed with a radial bearing shoulder and engaging a horizontal shoulder of collar 12. The insulating member 14 is formed with an upward extension 16 which has a closed upper end and has a longitudinal bore for the reception and protection of the upper end of the electrode.

The cylindrical member 8 is of electrical conductive material, such as copper, and electrical connection is made therewith by means of terminal stud 18 which has a threaded connection at its inner end and which is provided at its outer end with an enlargement containing a water passage or channel. Copper conduit connections 23 and 23' are made to the water channel for leading the water to and from the same. The terminal stud 18 is fitted to suitable apertures in the body members 1 and 2 with the interposition of an insulating sleeve 19 of "Transite" and in the assembly secures the body members 1 and 2 and the cylinder 8 in position.

For the purpose of water cooling the torch structure, body member 1 is formed externally to provide an annular water channel 20 through which cooling water is circulated. For this purpose intake pipe 21 and discharge pipe 22 are suitably connected to body member 1 and suitable connecting passages are provided to the annular cooling channel 20 which is closed at its outer side by means of a tubular member 24 closely fitted to the body member 1 as illustrated.

For the purpose of incorporating the novel arrangement of annular inner and outer protective gas discharge channels, the lower end of the torch structure is formed with a two-part frusto-conical discharge nozzle. This nozzle includes an inner nozzle member 26 which is internally threaded to the lower extension of body member 2 and which engages the lower end of the body extension by means of an inwardly-formed shoulder 28 providing a stop to limit the upward positioning of the inner nozzle member. The inner nozzle member is further formed for the major portion of its length with an outer inclined or frusto-conical surface 30 providing the inner wall of an annular gas discharge orifice or channel. The outer nozzle member 32 is of inclined wall or frusto-conical formation having its inner wall in parallel and spaced relation to the conical surface of the inner nozzle member. At its upper portion the outer nozzle member is formed for threaded engagement at 33 and engagement at 34 with the body member 1 to determine its position so as to properly define the annular, outer gas discharge channel or orifice 35 formed in cooperation with the inner nozzle member.

For the delivery of the primary shielding gas of helium or argon which is to be discharged through the nozzle surrounding the electrode, a lead-in tube or conduit 36 is connected to the body 1 and communicates through the inner body member 2 and insulating sleeve 10 with an annular channel 38 which is formed by the space between the reduced diameter portion of the cylindrical member 8 and the insulating sleeve 10. This channel 38 at its lower end communicates by means of an inwardly extending channel connection 39, formed in the upper portion of the flange 11 with a lower vertical channel 41. This channel 41 is formed by the spaced relation of the inner wall of body member 2 and an insulating sleeve 42 formed integral with members 10 and 11. The lower end of the channel 41 opens into the elongated discharge port 43 for the inner gas stream. The discharge port 43, as shown, is provided by the spaced relation of the electrode and a tubular sleeve or insert member 44. The member 44 is supported by a shrink fit to the nozzle 26 and extends within the lower end of the body 1 and is downwardly extended coextensive with the nozzle members. The members 26, 32 and 44 are made of any suitable material, for instance, a nickel-copper alloy sold under the trade-mark "Monel," or an iron-nickel-chromium alloy sold under the trade-mark "Incoloy." The horizontal cross channel 39 provides for change in the direction of the gas flow midway of the gas passage so as to obtain a desirable baffling effect. The presence and formation of the sleeve 44 at the position of its upper end effects an inward deflection of the gases immediately upon their entering discharge port 43. This further baffling effect contributes to the control of the inner gas stream so as to obtain desired uniform density and velocity of the gas discharge. The diameter of the port 43 may preferably be ⅜ inch and the port preferably has a length of 1$\frac{3}{16}$ inches. In the event of using a larger diameter electrode the bore may be of ½ inch diameter by substituting a nozzle member 26 without the sleeve 44.

The structural provision for introducing and conveying the outer gas column to its discharge port is of special design to provide an annular reservoir for the hydrogen gas communicating with the discharge port. The design is such that the direction of the gas flow is changed both upon entering and upon leaving the reservoir. As a result there is a more uniform distribution of the gas and control of the gas flow to insure uniformity of its density and velocity as it passes through the outer discharge port. A secondary gas, preferably hydrogen, is admitted to the torch by passage through a conduit 46 connected to an intake port of body member 1. The conduit 46 communicates by a curved channel 47 and vertical channel 48 with an annular horizontal connecting channel 49 formed between outer body member 1 and the inner body member 2 incident to their spaced relation. The annular channel 49 communicates with vertical channel or passage 50 formed between the respective members 1 and 2 and which at its lower end communicates by a series of ports or openings 51 with a reservoir 52. The reservoir 52 is formed by an annular depression in the upper surface of the inner nozzle member 26 and by special contouring of the internal surface of the outer nozzle member and the inner nozzle member so as to provide an annular enlargement or reservoir to which the gas is delivered from the ports 51. The formation of the reservoir is such that the gases admitted thereto will in effect have an initial substantial reversal in the direction of flow and will then be caused to flow outwardly and then downwardly through the annular discharge passage 30. The effect of this reversal in direction of gas flow is first to obtain a baffling effect and subsequent distribution of the gas to flow through the discharge port in a stream which is uniform as to its density and velocity so as to insure against turbulence in the gas stream.

As best shown in Fig. 1, a further improved feature of the discharge nozzle structure consists in providing the outer nozzle member 32 with an upwardly extending cylindrical flange 55 which as illustrated is in spaced relation to the torch outer structure or collar 24. As a result, this protective nozzle extension is heated sufficiently by the flame and heat of the welding arc so that the condensation of water vapor from the burning hydrogen causing sweating of the torch is reduced to a minimum.

The torch preferably has a hydrogen discharge orifice of a length of one-half inch and a width of from .015 inch to .020 inch. A further important factor is that the hydrogen orifice is converging so as to maintain intimate contact between the surrounding hydrogen column and the inner or primary inert gas column. The angle of the hydrogen discharge orifice is such that no appreciable admixing of the hydrogen and inert gas occurs in the arc zone. An angle of 20° has been found to give very satisfactory results but an angle in the range from about 10° to about 30° can be employed. A contributing feature in attaining the improved welding operation consists in the specific location of the hydrogen discharge port relative to the inner discharge port. It has been found to be critically important that the discharge ports for each of the gases shall be substantially flush with the tip of the inert gas nozzle to the end that the emerging hydrogen column is not contaminated by prior contact with the surrounding air.

For the purpose of giving those skilled in the art a better appreciation of the advantages of the invention, the test data given in the table show the effect and advantages attained by the use of the improved torch structure and method employing a primary shielding column of helium or of argon and a secondary enveloping column of hydrogen and in comparison with the results obtained by the employment of a well-known commercial or conventional torch design employing a single protective gas column of helium or argon and under comparable operating conditions.

Table
NOVEL TORCH

| Test No. | Weld Current | Primary Shielding Gas | Secondary Shielding Gas | Total Porosity in 10 Sections |
|---|---|---|---|---|
| 1 | 21 amps. D. C. | 10 C. F. H. A (99.8%) | 10 C. F. H. H$_2$ | 4 small. |
| 2 | 21 amps. D. C. | 20 C. F. H. He (99.8%) | 10 C. F. H. H$_2$ | Do. |
| 3 | 25 amps. A. C. | 20 C. F. H. He (99.8%) | 10 C. F. H. H$_2$ | 8 small. |
| 4 | 25 amps. A. C. | 10 C. F. H. A (99.8%) | 10 C. F. H. H$_2$ | 6 small. |

CONVENTIONAL TORCH

| Test No. | Weld Current | Primary Shielding Gas | Secondary Shielding Gas | Total Porosity in 10 Sections |
|---|---|---|---|---|
| 5 | 30 amps. A. C. | 10 C. F. H. A (99.8%) | | 250 large. |
| 6 | 30 amps. A. C. | 20 C. F. H. He (99.8%) | | 100 large. |
| 7 | 24 amps. D. C. | 20 C. F. H. He (99.8%) | | 55 small to medium. |
| 8 | 24 amps. D. C. | 10 C. F. H. A (99.8%) | | 170 large. |

A=argon; He=helium; H$_2$=hydrogen; C. F. H.=cubic feet per hour.

In the successful performance of welding, particularly in the welding of nickel and of nickel-base alloys, it has been found that certain features of the improved design of torch are of importance in their effect and contribute to the obtaining of welds substantially free of or low in porosity. Important factors in obtaining the improved results comprise the provision for the discharge of the hydrogen with uniform annular distribution and uniformity in density and velocity of the gas stream. This improved gas flow is accomplished by the provision of the reservoir 52 ahead of the entry into the discharge orifice or channel plus the inside nozzle design which effects substantial reversal in the flow of hydrogen before it enters the discharge orifice.

As further contributing to the smooth unidirectional or laminar flow of the gas from the discharge orifice, it is found that the relative dimensions are of importance and that highly superior results are obtained by making the length of the discharge orifice 30 long relative to its width.

In the tests manual edge welds were made on .037 gage standard cold rolled sheet of a high nickel-copper alloy and hydrogen was used as the secondary shielding gas. The test data were obtained from autogenous welds without the use of filler wire while employing a tungsten electrode to establish the welding arc between its tip and the work. An advantage of the improved torch is that it is not necessary to use special filler wires to obtain sound welds and the employment of filler wires is only required when added reinforcement is desired.

Comparative results indicate that with the employment of the improved torch and method markedly superior results with respect to porosity of the welds are obtained as compared to the results obtained by the use of the standard commercial torch employing the single protective helium or argon gas column as indicated.

It is to be observed that the present invention provides a welding torch designed to more successfully perform a gas-shielded arc welding operation and to insure obtaining a more uniform density and velocity of the gas streams thus eliminating turbulence and resulting tendency of air pickup or entrapment by the protective gases. As a result there is produced an improved torch which in its operation with the employment of helium or argon as the inner or primary protective gas stream and outer enveloping gas stream of hydrogen results in improved operating conditions suited for the satisfactory welding of nickel and of nickel-base alloys with substantial elimination of porosity of the weld, as commonly experienced in gas-shielded arc welding of these metals.

The improved torch has a special design to provide substantially flush relation of the respective gas discharge ports so as to effectively avoid air pickup; to provide for cooling of the terminal stud connection; to provide a special upwardly extending spaced collar on the nozzle member to avoid sweating incident to the cooling of the torch; to provide a special formation of the gas discharge passages so as to effect substantial reversal in the flow resulting in more uniform density and velocity of the gases as they emerge from the nozzle; and to provide a desirable and effective inclination of the hydrogen discharge orifice and critical relation of its dimensions which in their combined relation have demonstrated far superior operational results as indicated. The structural arrangement of the gas and water connections is such as to permit of the needed clearance at the nozzle end of the torch to facilitate manual welding operations. Moreover, the assembly is such as to readily permit of the employment of electrodes of varying diameter by the substitution of grip members 5 and inner nozzle members 26 and 44 of suitably varied internal diameter.

Moreover, it is to be noted that satisfactory results have been obtained by the present invention and that the difficulties heretofore encountered have been caused particularly by reason of objectionable turbulence in the protective gas streams with local areas of high velocity in the protective gas as it emerges from the torch nozzle. Such turbulence causes air pickup or entrapment of air by the turbulent gas stream. This is particularly deleterious in the welding of oxygen-sensitive metals and alloys where the air pickup has proven objectionable in causing excessive and detrimental porosity of the weld. It has been discovered that porosity in nickel and nickel-base alloy welds is caused by small amounts of atmospheric air contaminating the inert gas stream which surrounds the molten pool in the arc. The free oxygen of this air reacts with constituents in the molten pool resulting in gas formation and subsequent entrapment of this gas as the pool solidifies. In practical operations it was found that the less time the molten pool is exposed to this oxidizing condition the less porosity will be found in the weld.

The improved method of protecting the weld by the inner inert gas column encircled by the outer tangentially directed hydrogen column as performed by the use of the improved torch is diagrammatically shown in Fig. 5. As therein graphically shown by broken parallel lines the inner protective column of inert gas is surrounded or encircled by the inwardly directed and converging flow of hydrogen. As will be seen the hydrogen column is in tangential relation to the inner inert gas column to converge therewith at an angle of about 20° and in the region immediately surrounding the welding arc. The illustration shows the flow conditions which exist during the welding operation. In the customary manner of operation employing the single electrode the plates P to be welded are grounded through the work table upon which they are supported.

The welding torch of the present invention is particularly suited for the welding of nickel and nickel-base alloys by a manual welding operation. In such manual welding the speed of welding is relatively slow, such as from about 3″ to 30″ per minute. We have found that optimum results are obtained with gas volumes of 10 to 15 cubic feet per hour of hydrogen together with and from about 8 to 16 cubic feet per hour of argon as the inert gas or from 15 to 30 cubic feet per hour of helium as the inert gas. While there are many factors which in the use of our improved welding torch contribute to the successful welding of oxygen-sensitive metals, it is believed that the more critical factors reside in the specific provision for providing laminar flow of the inert gas stream with the protective and converging annular column of hydrogen directed to envelop the inert gas stream in the region of the arc zone. As a result of the protection afforded by the hydrogen enveloping the inert gas stream, air pickup by the latter and its deleterious effects is eliminated and, moreover, it is believed that the laminar flow or reduced turbulence of the inert gas stream is favorably influenced by the burning hydrogen by maintaining a more uniform temperature of the inert gas stream, thereby reducing convection currents caused by large differences in gas density. The specific arrangement of torch design providing for cooling remote from the nozzle members 26 and 32, in addition to the provision of the tubular insert 44 defining the discharge port 43, is conducive to maintaining uniform temperatures at the discharge end or nozzle of the torch with resulting avoidance of non-uniformity in gas density and resulting convection currents.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A shielded electric arc welding process comprising striking an arc between an electrode and the work to provide a weld zone, directing a laminar annular stream of helium gas surrounding the electrode and to blanket the metal in the weld zone and directing a secondary laminar annular hydrogen gas stream enveloping the helium gas stream, said hydrogen gas stream converging with said helium gas stream at an angle such that no appreciable admixing of the hydrogen gas and the helium occurs in the arc zone, whereby protection against air contamination of the helium gas stream is provided to substantially eliminate oxidation of the weld metal and resulting high porosity thereof.

2. A shielded electric arc welding process comprising striking an arc between an electrode and the work to provide a weld zone, directing a laminar annular stream of argon gas surrounding the electrode and to blanket the metal in the weld zone and directing a secondary laminar annular hydrogen gas stream enveloping the argon gas stream, said hydrogen gas stream converging with said argon gas stream at an angle such that no appreciable admixing of the hydrogen gas and the argon occurs in the arc zone, whereby protection against air contamination of the argon gas stream is provided to substantially eliminate oxidation of the weld metal and resulting high porosity thereof.

3. A shielded electric arc welding process comprising striking an arc between an electrode and the work to provide a weld zone, directing a laminar annular stream of inert gas surrounding the electrode and to blanket the metal in the weld zone and directing a secondary laminar annular hydrogen gas stream enveloping the inert gas stream, said hydrogen gas stream converging with said inert gas stream at an angle such that no appreciable admixing of the hydrogen gas and the inert gas occurs in the arc zone, whereby protection against air contamination of the inert gas stream is provided to substantially eliminate oxidation of the weld metal and resulting high porosity thereof.

4. A shielded electric arc welding process comprising striking an arc between an electrode and the work to provide a weld zone, directing a laminar annular stream of inert gas parallel to and surrounding the electrode and to blanket the metal in the weld zone and directing a secondary laminar annular hydrogen gas stream converging with the inert gas stream at an angle of from about 10 to about 30 degrees and enveloping the inert gas stream whereby protection against air contamination of the inert gas stream is provided to substantially eliminate oxidation of the weld metal and resulting high porosity thereof.

5. A shielded electric arc welding process comprising striking an arc between an electrode and the work to provide a weld zone, directing a laminar annular stream of helium gas parallel to and surrounding the electrode and to blanket the metal in the weld zone and directing a secondary laminar annular hydrogen gas stream converging with the helium stream at an angle of from about 10 to about 30 degrees and enveloping the helium gas stream whereby protection against air contamination of the helium gas stream is provided to substantially eliminate oxidation of the weld metal and resulting high porosity thereof.

6. A shielded electric arc welding process comprising striking an arc between an electrode and the work to provide a weld zone, directing a laminar annular stream of argon gas parallel to and surrounding the electrode and to blanket the metal in the weld zone and directing a secondary laminar annular hydrogen gas stream converging with the argon stream at an angle of from about 10 to about 30 degrees and enveloping the argon gas stream whereby protection against air contamination of the argon gas stream is provided to substantially eliminate oxidation of the weld metal and resulting high porosity thereof.

7. A welding torch structure for inert gas-shielded arc welding operations comprising a torch assembly including tubular supporting, inner and outer nozzle, and electrode gripping members, members of the said assembly being formed to provide inner and outer gas passages, an electrode supported by the gripping members axially of the assembly and to project from the nozzle members, and said assembly providing an inner discharge port immediately surrounding the electrode and communicating with the inner gas passage to discharge an inert gas through the inner nozzle member and said inner and outer nozzle members being formed mutually to provide an outer annular and inwardly inclined gas discharge orifice having a discharge port substantially in the plane of the discharge end of the inner discharge port, and said nozzle and supporting members, adjacent the upper end of the inner nozzle, forming an annular gas reservoir communicating with the outer gas passage so as to effect change in the direction of the gases passed through the reservoir, and means for introducing an inert gas to the inner gas passage and hydrogen gas to the outer gas passage for protectively enveloping the inert gas stream in the region of the welding arc.

8. A welding torch structure for inert gas-shielded arc welding operations comprising a torch assembly including tubular supporting, inner and outer nozzle, and electrode gripping members, members of the said assembly being formed to provide inner and outer gas passages, and a water cooling passage, an electrode supported by the gripping members axially of the assembly and to project from the nozzle members, and said assembly providing an inner discharge port immediately surrounding the electrode and communicating with the inner gas passage to discharge an inert gas through the inner nozzle member and said inner and outer nozzle members being formed mutually to provide an annular and inwardly inclined outer gas discharge orifice having a discharge port substantially in the plane of the discharge end of the inner discharge port, and said nozzle and supporting members, adjacent the upper end of the inner nozzle, forming an annular gas reservoir communicating with the outer gas passage so as to effect change in the direction of the gases passed through the reservoir, means for introducing an inert gas to the inner gas passage and hydrogen gas to the outer gas passage for protectively enveloping the inert gas stream in the region of the welding arc, means for introducing water to the cooling passage, and an upper sleeve extension on the outer nozzle member in spaced relation to the external surface of the torch structure and positioned to be effective to reduce condensation incident to the cooling of the torch.

9. A welding torch structure for inert gas-shielded arc welding operations comprising a torch assembly including tubular supporting, inner and outer nozzle, and electrode gripping members, the gripping members consisting of a longitudinally split, tapered-end clutch member and a coacting sleeve having a complemental tapered seat, said gripping members being insulated from the supporting members, a terminal stud connected to the gripping sleeve member and having an external enlargement formed with a water passage, tubular conductors connected to the sleeve enlargement and communicating with the passage therein for cooling of the terminal stud, the members of the said assembly being formed to provide inner and outer gas passages and a water cooling passage, an electrode supported by the gripping members to extend axially of the assembly and to project from the nozzle members, said assembly providing an inner discharge port immediately surrounding the electrode and communicating with the inner gas passage to discharge an inert gas through the inner nozzle member and said inner and outer nozzle members being formed mutually to provide an annular and inwardly inclined outer gas discharge orifice having a discharge port substantially in the plane of the discharge end of the inner gas port, and said nozzle and supporting members, adjacent the upper end of the inner nozzle, forming an annular gas reservoir communicating with the outer gas passage so as to effect change in the direction of the gases passed through the reservoir, and means for introducing an inert gas to the inner gas passage and hydrogen gas to the outer gas passage for protectively enveloping the inert gas stream in the region of the welding arc.

10. A welding torch structure for inert gas-shielded arc welding operations comprising a torch assembly including tubular supporting, inner and outer nozzle, and electrode gripping members, the members of the said assembly being formed to provide inner and outer gas passages and an annular water cooling passage, an electrode supported by the gripping members axially of the assembly and insulated from the supporting members and to project from the nozzle members, and said assembly providing an inner discharge port immediately surrounding the electrode and communicating with the inner gas passage to discharge an inert gas through the inner nozzle member, said inner and outer nozzle members being formed mutually to provide an annular and inwardly inclined outer gas discharge orifice having a discharge port substantially in the plane of the discharge end of the inner gas port, and said nozzle and supporting members at the upper end of the inner nozzle forming an annular gas reservoir communicating with the outer gas passage so as to effect change in the direction of the gases passed through the reservoir, and means for introducing an inert gas to the inner gas passage and hydrogen gas to the outer gas passage for protectively enveloping the inert gas stream in the region of the welding arc and means for introducing water to the water cooling passage.

11. A welding torch structure for inert gas-shielded arc welding operations comprising a torch assembly including tubular supporting, inner and outer nozzle, and electrode gripping members, the members of the said assembly being formed to provide inner and outer gas passages extending to the nozzle end of the assembly and a water cooling annular passage, an electrode supported by the gripping members axially of the assembly and to project from the nozzle members, said assembly providing an inner discharge port immediately surrounding the electrode and communicating with the inner gas passage to discharge an inert gas through the inner nozzle member and said inner and outer nozzle members being formed mutually to provide an annular and inwardly inclined outer gas discharge orifice having a discharge port substantially in the plane of the discharge end of the inner gas port, said nozzle and supporting members at the upper end of the inner nozzle forming an annular gas reservoir communicating with the outer gas passage so as to effect change in the direction of the gases passed through the reservoir, means for introducing an inert gas to the inner gas passage and hydrogen gas to the outer gas passage for protectively enveloping the inert gas stream in the region of the welding arc, means to introduce water to the water cooling passage, and said outer nozzle member being formed with an upwardly extending sleeve in spaced relation to the lower end of the torch assembly to be effective to reduce condensation incident to the cooling of the torch.

12. A welding torch structure for inert gas-shielded arc welding operations comprising a torch assembly including tubular supporting, inner and outer nozzle, and electrode gripping members, the members of the said assembly being formed to provide inner and outer gas passages, an electrode supported by the gripping members axially of the assembly and to project from the nozzle members, and said assembly providing an inner discharge port immediately surrounding the electrode and communicating with the inner gas passage to discharge an inert gas through the inner nozzle member, said inner and outer nozzle members being formed mutually to provide an annular and inwardly inclined outer gas discharge orifice having a length of about one-half inch and a width of from about .015 inch to .020 inch and having a discharge port substantially in the plane of the discharge end of the inner gas port, said nozzle and supporting members adjacent the upper end of the inner nozzle forming an annular gas reservoir communicating with the outer gas passage so as to effect change in the direction of the gases passed through the reservoir, and means for introducing an inert gas to the inner gas passage and hydrogen gas to the outer gas passage for protectively enveloping the inert gas stream in the region of the welding arc.

13. A welding torch structure for inert gas-shielded arc welding operations comprising a torch assembly including tubular supporting, inner and outer nozzle, and electrode gripping members, the members of the said assembly being formed to provide inner and outer gas passages, an electrode supported by the gripping member axially of the assembly and to project from the nozzle members, said assembly providing an inner discharge port immediately surrounding the electrode and communicating with the inner gas passage to discharge an inert gas through the inner nozzle member, said inner and outer nozzle members being formed mutually to provide an annular and inwardly inclined outer gas discharge orifice, a terminal stud connected to the gripping sleeve member and having an external enlargement formed with a water passage, tubular conductors connected to the sleeve enlargement and communicating with the passage therein for cooling of the terminal stud, said outer discharge orifice having an angularity of from 10° to 30° relative to the longitudinal axis of the torch and having a discharge port substantially in the plane of the discharge end of the inner gas port, said nozzle and supporting members adjacent the upper end of the inner nozzle forming an annular gas reservoir communicating with the outer gas passage so as to effect change in the direction of the gases passed through the reservoir, and means for introducing an inert gas to the inner gas passage and hydrogen gas to the outer gas passage for protectively enveloping the inert gas stream in the region of the welding arc.

14. A welding torch structure for inert gas-shielded arc welding operations comprising a torch assembly including tubular supporting, inner and outer nozzle, and electrode gripping members, the members of the said assembly being formed to provide inner and outer gas passages and a water cooling passage, an electrode supported by the gripping member axially of the assembly and to project from the nozzle members, said assembly providing an inner discharge port immediately surrounding the electrode and communicating with the inner gas passage to discharge an inert gas through the inner nozzle member and said inner and outer nozzle members being formed mutually to provide an annular and inwardly inclined outer gas discharge orifice having a length of about one-half inch and a width of from about .015 inch to .020 inch and having a discharge port substantially in the plane of the discharge end of the innert gas port, said discharge orifice having an angularity of from 10° to 30° relative to the longitudinal axis of the torch, and said nozzle and supporting members adjacent the upper end of the inner nozzle, forming an annular gas reservoir communicating with the outer gas passage so as to effect change in the direction of the gases passed through the reservoir, means for introducing an inert gas to the inner gas passage and hydrogen gas to the outer gas passage for protectively enveloping the inert gas stream in the region of the welding arc, means for introducing water to the cooling passage, and an upper sleeve extension on the outer nozzle member in spaced relation to the external surface of the torch structure and positioned to be effective to reduce condensation incident to the cooling of the torch.

References Cited in the file of this patent

UNITED STATES PATENTS

| Number | Name | Date |
|---|---|---|
| 903,826 | Arsem | Nov. 17, 1908 |
| 2,512,705 | Anderson | June 27, 1950 |
| 2,522,482 | Olzak | Sept. 12, 1950 |